(12) United States Patent
Sato et al.

(10) Patent No.: US 9,758,892 B2
(45) Date of Patent: Sep. 12, 2017

(54) STEEL SHEET FOR ELECTROPLATING, ELECTROPLATED STEEL SHEET, AND METHODS FOR PRODUCING THE SAME

(71) Applicant: NIPPON STEEL & SUMITOMO METAL CORPORATION, Chiyoda-ku, Tokyo (JP)

(72) Inventors: Hironori Sato, Tokyo (JP); Masao Kurosaki, Tokyo (JP); Masahiro Fuda, Tokyo (JP); Natsuko Sugiura, Tokyo (JP); Yuji Yamaguchi, Tokyo (JP)

(73) Assignee: NIPPON STEEL & SUMITOMO METAL CORPORATION, Tokyo (JP)

( * ) Notice: Subject to any disclaimer, the term of this patent is extended or adjusted under 35 U.S.C. 154(b) by 233 days.

(21) Appl. No.: 14/391,048

(22) PCT Filed: Apr. 12, 2013

(86) PCT No.: PCT/JP2013/061064
§ 371 (c)(1),
(2) Date: Oct. 7, 2014

(87) PCT Pub. No.: WO2013/154184
PCT Pub. Date: Oct. 17, 2013

(65) Prior Publication Data
US 2015/0118518 A1    Apr. 30, 2015

(30) Foreign Application Priority Data
Apr. 13, 2012  (JP) ................................. 2012-092341

(51) Int. Cl.
*C25D 5/36* (2006.01)
*C23G 1/19* (2006.01)
(Continued)

(52) U.S. Cl.
CPC .............. *C25D 5/36* (2013.01); *B32B 15/013* (2013.01); *B32B 15/015* (2013.01); *C21D 8/021* (2013.01);
(Continued)

(58) Field of Classification Search
None
See application file for complete search history.

(56) References Cited

U.S. PATENT DOCUMENTS

2010/0092121 A1*  4/2010  Hanano ..................... C23C 2/26
384/527

FOREIGN PATENT DOCUMENTS

| CN | 101223301 A | 7/2008 |
|---|---|---|
| EP | 2143816 A1 | 1/2010 |

(Continued)

OTHER PUBLICATIONS

Machine-English translation of Japanese publication No. 2011-219845, Sato Hirotetsu et al., Nov. 4, 2011.*

(Continued)

*Primary Examiner* — Deborah Yee
(74) *Attorney, Agent, or Firm* — Birch, Stewart, Kolasch & Birch, LLP (57) ABSTRACT

A steel sheet for electroplating includes, by mass %, C: 0.0005% to 0.0050%, Si: 0.20% to 1.0%, Mn: 0.40% to 2.5%, P: 0.05% or less, Ti: 0.010% to 0.050%, Nb: 0.010% to 0.040%, B: 0.0005% to 0.0030%, S: 0.02% or less, Al: 0.01% to 0.30%, N: 0.0010% to 0.01%, and the balance including Fe and impurities, in which when Si content is represented by [Si] and Mn content is represented by [Mn], "[Mn]+5[Si]" is 2.0 to 7.0, and the steel sheet has surface property in which an average of displacements of a measurement point obtained based on a moving average of continuous 31 points in total including 15 front points and 15

(Continued)

back points in a cross-sectional profile of a surface obtained by measuring the average of displacements in an evaluation length of 10 μm or more at an interval of 0.07 μm, is 0.005 μm to 0.10 μm.

2 Claims, 2 Drawing Sheets

(51) Int. Cl.
| | |
|---|---|
| C23G 1/08 | (2006.01) |
| C21D 8/00 | (2006.01) |
| B32B 15/01 | (2006.01) |
| B32B 15/18 | (2006.01) |
| C22C 18/00 | (2006.01) |
| C22C 38/00 | (2006.01) |
| C22C 38/14 | (2006.01) |
| C22C 38/02 | (2006.01) |
| C22C 38/04 | (2006.01) |
| C22C 38/06 | (2006.01) |
| C22C 38/12 | (2006.01) |
| C21D 9/46 | (2006.01) |
| C25D 7/06 | (2006.01) |
| C21D 8/02 | (2006.01) |
| C25D 3/56 | (2006.01) |

(52) U.S. Cl.
CPC ......... *C21D 8/0236* (2013.01); *C21D 8/0263* (2013.01); *C21D 8/0278* (2013.01); *C21D 9/46* (2013.01); *C22C 18/00* (2013.01); *C22C 38/00* (2013.01); *C22C 38/001* (2013.01); *C22C 38/002* (2013.01); *C22C 38/004* (2013.01); *C22C 38/02* (2013.01); *C22C 38/04* (2013.01); *C22C 38/06* (2013.01); *C22C 38/12* (2013.01); *C22C 38/14* (2013.01); *C23G 1/081* (2013.01); *C23G 1/086* (2013.01); *C25D 7/0614* (2013.01); *C21D 8/0226* (2013.01); *C21D 8/0273* (2013.01); *C25D 3/565* (2013.01); *Y10T 428/12799* (2015.01)

(56) References Cited

FOREIGN PATENT DOCUMENTS

| | | |
|---|---|---|
| JP | 63-140098 | 6/1988 |
| JP | 04-362193 | 12/1992 |
| JP | 05-230689 | 9/1993 |
| JP | 05-320981 | 12/1993 |
| JP | B-3293681 | 6/2002 |
| JP | 3327222 | 9/2002 |
| JP | B-3354610 | 12/2002 |
| JP | A-2009-243690 | 10/2009 |
| JP | 2011-219845 | 11/2011 |
| TW | 565621 | 12/2003 |
| WO | WO 2008/126945 A1 | 10/2008 |

OTHER PUBLICATIONS

International Search Report dated Jul. 16, 2013 issued in corresponding PCT Application No. PCT/JP2013/061064 [with English Translation].

Office Action dated Jul. 8, 2014 issued in corresponding Taiwan Application No. 102113100 [with English Translation].

European Search Report dated Oct. 8, 2015 issued in corresponding European Patent Application No. 13776099.7.

Office Action dated Dec. 28, 2015 issued in corresponding Chinese Patent Application No. 2013 80019097.4.

* cited by examiner

STEEL SHEET FOR ELECTROPLATING, ELECTROPLATED STEEL SHEET, AND METHODS FOR PRODUCING THE SAME

TECHNICAL FIELD OF THE INVENTION

This application is a national stage application of International Application No. PCT/JP2013/061064, filed Apr. 12, 2013, which claims priority to Japanese Patent Application No. 2012-092341, filed on Apr. 13, 2012, each of which is incorporated by reference in its entirety.

The present invention relates to a steel sheet for electroplating, an electroplated steel sheet, and methods for producing the same. More specifically, the present invention relates to an electroplated steel sheet for press working which is applied to the field of automobiles, the home electronics, and the like, a steel sheet for electroplating which is a material of the electroplated steel sheet, and methods for producing the same, and particularly relates to an electroplated steel sheet for press working which is desirable for use in a fuel tank of a vehicle and is superior in plating adhesion, a steel sheet for electroplating which is a material of the electroplated steel sheet, and methods for producing the same.

RELATED ART

Recently, in the field of automobiles, improvement of fuel efficiency has been progressing by reducing the vehicle weight. Regarding a fuel tank of a vehicle, the shape of the fuel tank has become complicated in consideration of reduction in the weight of a steel sheet for a tank, complication of a vehicle body design, and a tank storage position. Therefore, superior formability is required for a steel sheet for a tank.

In order to satisfy such a requirement of formability, IF (Interstitial Free) steel in which a carbonnitride-forming element such as Ti or Nb is added to ultra low carbon steel has been developed. Further, for fuel tanks, a steel sheet has also been required in which a corrosion product which causes the clogging of a filter is not produced by gasoline, alcohol, or an organic acid produced by degradation of gasoline and thus pitting corrosion does not occur.

In order to satisfy this requirement, in the related art, the plating of a Pb—Sn alloy, an Al—Si alloy, a Sn—Zn alloy, a Zn—Al alloy, or a Zn—Ni alloy on a steel sheet surface has been proposed and applied. Therefore, a steel sheet which is a plating substrate must have superior plating properties with the above alloys and superior plating adhesion during press forming or in a usage environment.

However, recently, along with complication of the shape of fuel tanks, in a steel sheet subjected to harsh press forming, there has been a problem regarding plating adhesion in that a plating layer is exfoliated. That is, even if the formability of a steel sheet is improved, there has been a limit to the improvement of press formability due to the restriction of plating adhesion.

In order to solve such a problem, several methods for improving the plating adhesion of electroplating have been proposed.

For example, Patent Document 1 proposes a technique in which the electroplating adhesion of Zn, a Zn alloy, Fe, or a Fe alloy is improved by subjecting a steel sheet containing 11% or more of Cr to shot blasting in an atmosphere of inert gas or reducing gas.

Patent Document 2 proposes a technique in which the plating adhesion of Zn-alloy-electroplating is improved by pickling a polished surface of a base metal to be uniformly treated using a pickling solution to which thiouric acid is added.

Patent Document 3 discloses a technique in which the plating adhesion of an electroplated steel sheet is improved by annealing a steel sheet, which is rolled with a bright roll having a small amount of surface convex-concave portions, polishing a surface of the steel sheet as a plating pretreatment, and pickling the surface in a hydrochloric acid solution containing sodium hydrogen fluoride.

Patent Document 4 discloses a technique in which plating adhesion is improved by polishing a surface of an annealed steel sheet as a plating pretreatment, pickling the surface for 10 seconds or less, and forming an electroplating layer on the surface.

Patent Document 5 discloses a technique in which the plating adhesion of a Zn based-electroplated steel sheet is improved by polishing a non-plated surface of a base metal with an abrasive material containing abrasive grains and forming a Zn-electroplating layer on the surface.

PRIOR ART DOCUMENT

Patent Document

[Patent Document 1] Japanese Unexamined Patent Application, First Publication No. H04-362193
[Patent Document 2] Japanese Patent No. 3327222
[Patent Document 3] Japanese Unexamined Patent Application, First Publication No. H05-320981
[Patent Document 4] Japanese Unexamined Patent Application, First Publication No. H05-230689
[Patent Document 5] Japanese Unexamined Patent Application, First Publication No. S63-140098

DISCLOSURE OF THE INVENTION

Problems to be Solved by the Invention

However, even with any of the above-described techniques, it is difficult to secure plating adhesion when a steel sheet is press-formed into a complicated shape such as a fuel tank.

That is, the technique of Patent Document 1 is effective for, for example, a steel sheet containing 11% or more of Cr on which a passive state film is formed. This technique is a technique only for removing the passive state film which decreases plating adhesion, not a technique for improving the plating adhesion of a steel sheet containing a small Cr content.

With the technique of Patent Document 2, the surface can be made to be uniform, but plating adhesion cannot be secured when a steel sheet is pressed into a complicated shape such as a fuel tank. With the technique of Patent Document 3, an oxide can be removed with a small polishing amount, but plating adhesion cannot be secured when a steel sheet is pressed into a complicated shape.

With the technique of Patent Document 4, the surface can be made to be smooth, but plating adhesion cannot be secured when a steel sheet is pressed into a complicated shape such as a fuel tank. With the technique of Patent Document 5, plating adhesion cannot be secured when a steel sheet is pressed into a complicated shape, and it is necessary that the processing time and the size of facilities be increased to completely remove an oxide film by polishing. Therefore, it is difficult to apply this technique in practice.

As described above, among the techniques of the related art, there is a technique of improving plating adhesion, but there is no technique to be applied to a fuel tank, in which plating adhesion is secured during complicated press forming.

The present invention has been made to solve the above-described technical problem, and an object thereof is to provide an electroplated steel sheet for press working which can secure superior plating adhesion even during complicated press forming and is desirable for use in the automobile field or the home electronics field, particularly, for use in a fuel tank of a vehicle; a steel sheet for electroplating which is a material of the electroplated steel sheet; and methods for producing the same.

Means for Solving the Problem

In the present invention, in order to solve the above-described problem, the plating adhesion of a steel sheet which is press-formed into a complicated shape such as a fuel tank has been studied. As a result, it was found that superior plating adhesion can be obtained by measuring a surface roughness, which is too fine to be measured with a normal contact surface roughness meter, with a laser microscope and adjusting the surface roughness to be within a desired range.

The present invention has been made based on the above finding, and the scope thereof is as follows.

(1) According to a first aspect of the present invention, there is provided a steel sheet for electroplating including, as a chemical composition, by mass %, C: 0.0005% to 0.0050%, Si: 0.20% to 1.0%, Mn: 0.40% to 2.5%, P: 0.05% or less, Ti: 0.010% to 0.050%, Nb: 0.010% to 0.040%, B: 0.0005% to 0.0030%, S: 0.02% or less, Al: 0.01% to 0.30%, N: 0.0010% to 0.01%, and the balance including Fe and impurities, in which in the chemical composition, when a Si content is represented by [Si] and a Mn content is represented by [Mn], a value of "[Mn]+5[Si]" is 2.0 to 7.0, and the steel sheet has a surface property in which an average of displacements of a measurement point that is obtained based on a moving average of continuous 31 points in total including 15 front points and 15 back points in a cross-sectional profile of a surface of the steel sheet obtained by measuring the average of displacements in an evaluation length of 10 μm or more at an interval of 0.07 μm is 0.005 μm to 0.10 μm.

(2) According to a second aspect of the present invention, there is provided an electroplated steel sheet obtained by forming an electroplating layer on the surface of the steel sheet for electroplating according to (1).

(3) According to a third aspect of the present invention, there is provided a method for producing a steel sheet for electroplating, the method including: continuously casting molten steel having the chemical composition according to (1) into a slab; heating the slab in a temperature range of 1000° C. to 1300° C.; hot-rolling the heated slab under a finishing rolling temperature of $Ar_3$ temperature to 1000° C. and a coiling temperature of 850° C. or lower to obtain a hot-rolled steel sheet; removing a surface scale of the hot-rolled steel sheet to obtain a pickled steel sheet, as a first pickling process; cold-rolling the pickled steel sheet at a cold rolling reduction of 40% or higher to obtain a cold-rolled steel sheet; annealing the cold-rolled steel sheet at a recrystallization temperature or higher; and pickling a surface of the steel sheet using 10 g/l to 400 g/l of a sulfuric acid aqueous solution or using a pickling solution in which one or more selected from the group consisting of nitrates, sulfates, fluorosilicates, and fluoroborates are mixed with the sulfuric acid aqueous solution, as a second pickling process.

(4) According to a fourth aspect of the present invention, there is provided a method for producing an electroplated steel sheet including forming an electroplating layer, which contains 0% to 20% of Ni and the balance including Zn and impurities, on the surface of the steel sheet for electroplating, which is obtained using the method according to (3), in an amount of 3 g/m² to 100 g/m² per single surface.

Effects of the Invention

According to the present invention, a steel sheet having superior plating adhesion can be obtained, and it is possible to provide an electroplated steel sheet which has superior press formability and plating adhesion in the field of automobiles and home electronics, particularly, for use in a fuel tank of a vehicle; a steel sheet for electroplating which is a material of the electroplated steel sheet; and methods for producing the same. In addition, according to the present invention, the allowable processing degree of a plated steel sheet is improved, and reduction in the weight of a vehicle, particularly, a fuel tank and complication of a vehicle body design can be realized.

EMBODIMENTS OF THE INVENTION

Hereinafter, an embodiment of the present invention will be described in detail. In the following description, "mass %" of a chemical composition will be referred to simply as "%".

After diligent research, the present inventors have obtained an electroplated steel sheet having superior plating adhesion even in press working into a complicated shape such as a fuel tank which is extremely difficult to obtain in the related art. As a result, it was found that superior plating adhesion can be obtained by measuring a surface roughness, which is too fine to be measured with a normal contact surface roughness meter, with a laser microscope and adjusting the surface roughness to be at the level described later.

It was also found that, to that end, superior plating adhesion can be realized by controlling the Si content and the Mn content to be within a specific range and pickling a non-plated surface of a steel sheet using 10 g/l to 400 g/l of a sulfuric acid aqueous solution or using a pickling solution in which one or more selected from the group consisting of nitrates, sulfates, fluorosilicates, and fluoroborates are mixed with the sulfuric acid aqueous solution.

It was found that from the above findings that press formability and plating adhesion, which are applicable to, for example, the field of automobiles or home electronics and particularly to a complicated shape such as a fuel tank of a vehicle, can be realized, thereby completing the present invention.

That is, an electroplated steel sheet according to the present invention includes: a cold-rolled steel sheet; and a plating layer that is formed on a surface of the cold-rolled steel sheet. The electroplated steel sheet contains, by mass %, C: 0.0005% to 0.0050%, Si: 0.20% to 1.0%, Mn: 0.40% to 2.5%, P: 0.05% or less, Ti: 0.010% to 0.050%, Nb: 0.010% to 0.040%, B: 0.0005% to 0.0030%, S: 0.02% or less, Al: 0.01% to 0.30%, N: 0.0010% to 0.01%, and the balance including Fe and impurities. In the electroplated steel sheet, when a Si content is represented by [Si] and a Mn content is represented by [Mn], a value of "[Mn]+5[Si]" is 2.0 to 7.0, and the steel sheet has a surface property in which an average of displacements of a measurement point that is obtained based on a moving average of continuous 31 points in total including 15 front points and 15 back points in a cross-sectional profile of a surface of the steel sheet obtained by measuring the average of displacements in an evaluation length of 10 μm or more at an interval of 0.07 μm, is 0.005 μm to 0.10 μm.

Hereinafter, the details of an experiment and analysis from which the above facts were found by the present inventors will be described. The present inventors produced a hot-rolled steel sheet by melting steel having a composition, which was changed in ranges of C: 0.0005% to 0.0050%, Si: 0.06% to 1.4%, Mn: 0.1% to 3.5%, P: 0.05% or less, Ti: 0.010% to 0.050%, Nb: 0.010% to 0.040%, B: 0.0005% to 0.0030%, S: 0.02% or less, Al: 0.01% to 0.30%, and N: 0.0010% to 0.01%, in a vacuum melting furnace, heating the molten steel at 1230° C. for 1 hour, and hot-rolling the steel at a finishing rolling temperature of 850° C. to 950° C.

Next, this hot-rolled steel sheet was pickled and then was cold-rolled at a cold rolling reduction of 50% to 90% to obtain a cold-rolled steel sheet. This cold-rolled steel sheet was annealed in a cycle of being held at 800° C. for 60 seconds in an atmosphere containing 95% of nitrogen and 5% of hydrogen to obtain an annealed steel sheet.

Next, a surface of the annealed steel sheet was pickled using a sulfuric acid aqueous solution and using a solution in which one to four kinds of nitrates, sulfates, fluorosilicates, and fluoroborates was added to the sulfuric acid aqueous solution. Next, a Zn electroplating layer or a Zn—Ni electroplating layer, which contained 0% to 20% of Ni and the balance including Zn and impurities, was formed on the surface of the steel sheet to obtain an electroplated steel sheet.

Next, a Dupont impact test was performed using the electroplated steel sheet to evaluate the adhesion of the plating layer. In the Dupont impact test, assuming that the steel sheet was pressed into a complicated shape such as a fuel tank, a weight having a tip shape with a punch diameter of 4 mm and a weight of 500 g which was more strict than a normal one (punch diameter: 5 mm) was allowed to fall to the steel sheet from a height of 1 m.

Figure 1:
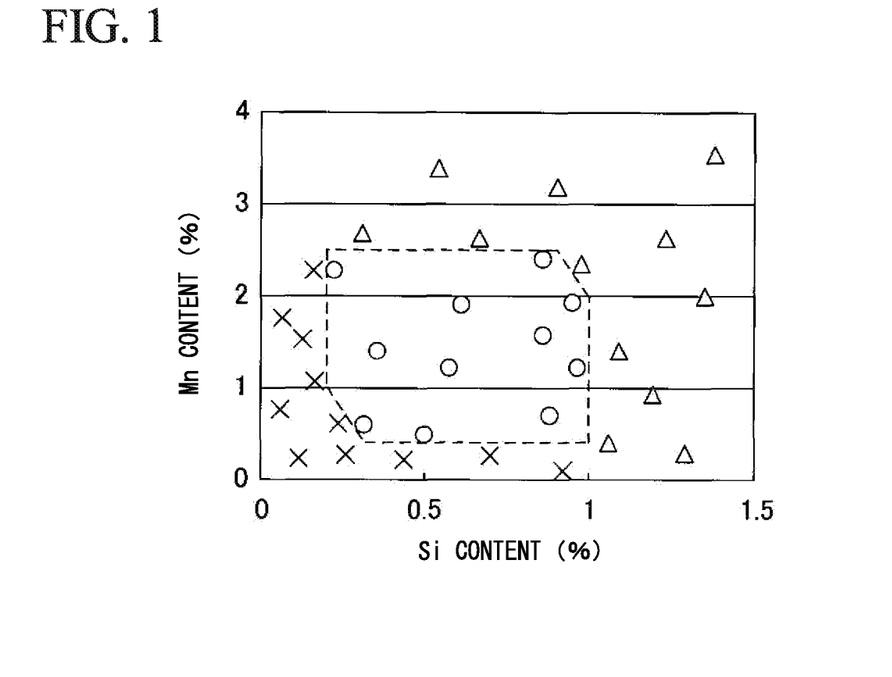
FIG. 1 is a drawing illustrating a relationship of the Si content and the Mn content with plating adhesion.

The results are illustrated in FIG. 1. In FIG. 1, the horizontal axis represents the Si content, the vertical axis represents the Mn content, a case where there was no plating exfoliation is represented by "o", and a case where there was plating exfoliation is represented by "x" or "Δ". Whether or not there was plating exfoliation was determined by attaching an adhesive tape on a sample surface and then peeling therefrom after the test. A case where no plating layer was exfoliated was determined as "no plating exfoliation (o)", and a case where a plating layer was exfoliated and attached on the adhesive tape was determined as "plating exfoliation (x or Δ)". Regarding a difference between x and Δ of the case of plating exfoliation, exfoliation caused by a surface fine convex-concave portion (described below) of less than 0.005 μm was represented by "x", and exfoliation caused by a surface fine convex-concave portion of more than 0.10 μm was represented by "Δ".

It was found from the results of the Dupont test that superior plating adhesion can be secured by controlling the Si content to be 0.20% to 1.0%, controlling the Mn content to be 0.40% to 2.5%, and controlling a value of "[Mn]+5[Si]" to be 2.0 to 7.0 when the Si content is represented by [Si] and the Mn content is represented by [Mn].

Further, in order to examine the mechanism of the above-described phenomenon, the present inventors have thoroughly investigated the surface property of a steel sheet immediately before plating. As a result, the present inventors have found that there is a correlation between whether or not there is plating exfoliation and surface fine convex-concave portions, thereby completing the present invention. The surface fine convex-concave portions were measured as follows using shape measurement laser microscopes VK-8700 and VK-8710 series (manufactured by Keyence Corporation).

Figure 2:
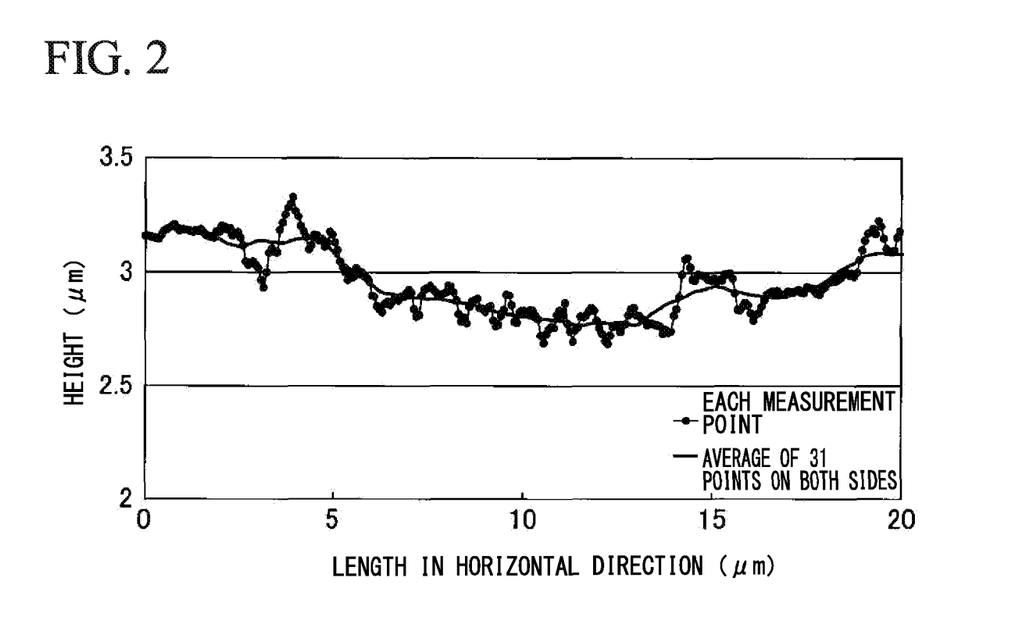
FIG. 2 is a drawing illustrating a measurement example of surface fine convex-concave portions (in the present invention, a difference between the height of each measurement point measured at an interval of 0.07 μm and the average of heights of 31 points on both sides in a measurement direction of the measurement point is calculated, and an index is obtained using all the average values.)
Figure 3:
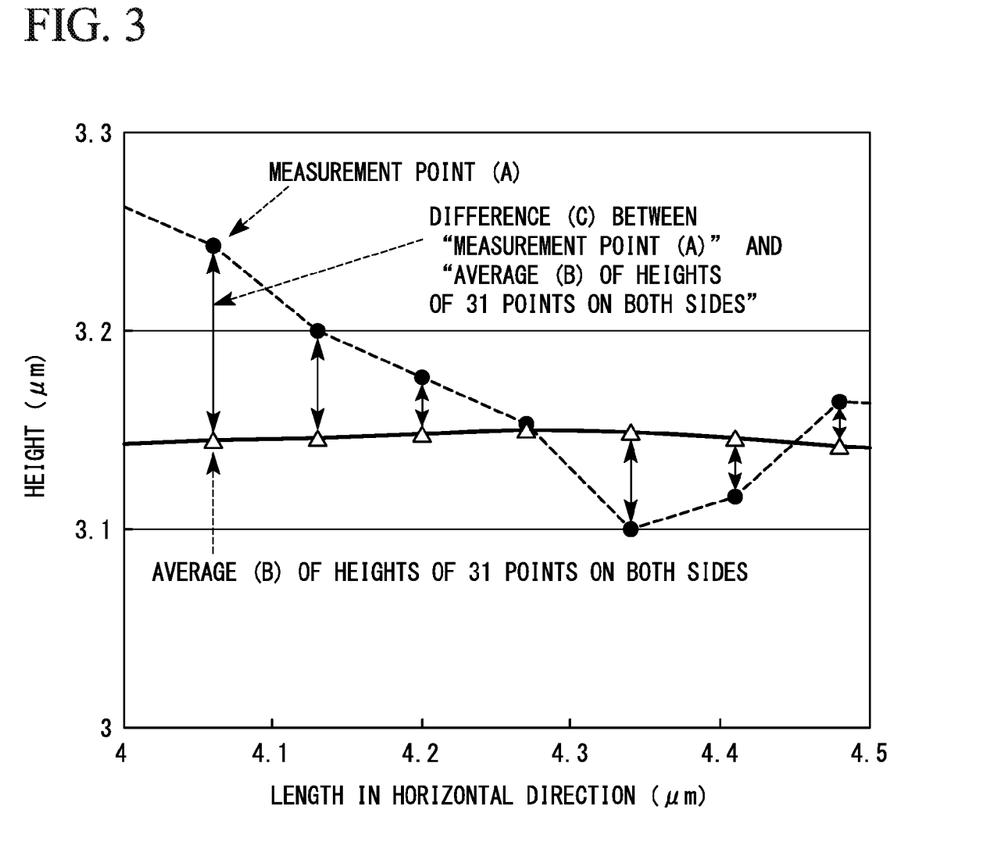
FIG. 3 is an enlarged view of FIG. 2 illustrating "a measurement point (A)", "the average (B) of heights of 31 points on both sides", and "a difference (C) between the measurement point (A) and the average (B) of heights of 31 points on both sides".

That is, as illustrated in FIGS. 2 and 3, in a case where the surface fine convex-concave portions of a steel sheet had a surface property in which an average of displacements of a measurement point that is obtained based on a moving average of continuous 31 points in total including 15 front points and 15 back points in a cross-sectional profile of a surface of the steel sheet obtained by measuring the average of displacements in an evaluation length of 10 μm or more at an interval of 0.07 μm (hereinafter, referred to as "fine convex-concave portion height") is 0.005 μm to 0.10 μm, plating exfoliation did not occur and superior plating adhesion was obtained. However, when the fine convex-concave portion height was less than 0.005 μm (x in FIG. 1) or was more than 0.10 μm (Δ in FIG. 1), plating exfoliation occurred. In FIG. 3, "a measurement point (A)" corresponds to "the measurement point", "the average (B) of heights of 31 points on both sides" corresponds to "the moving average of continuous 31 points in total including 15 front points and 15 back points", and "a difference (C) between the measurement point (A) and the average (B) of heights of 31 points on both sides" corresponds to "a displacement of a measurement point which is obtained based on a moving average of continuous 31 points in total including 15 front points and 15 back points".

The reason is not clear but can be presumed to be as follows. When the fine convex-concave portion height is less than 0.005 μm, an anchor effect of a plating layer to a matrix is smaller than that of a case where the fine convex-concave portion height is 0.005 μm or more. On the other hand, when the fine convex-concave portion height is more than 0.10 μm, the convex-concave portions are excessively large, hydrogen is likely to be generated during electroplating. In addition, hydrogen is more likely to accumulate, and a plating layer is likely to be exfoliated when an impact is applied thereto.

Next, the reason for limiting the chemical composition of the steel sheet according to the present invention will be described.

<C: 0.0005% to 0.0050%>

C is an extremely important element. Specifically, C is an element which binds to Nb or Ti to form a carbide and is effective for achieving high-strengthening. However, when the C content is more than 0.0050%, workability is decreased even with the addition of Ti and Nb which are necessary for immobilizing C, and weld toughness is decreased. Accordingly, the C content is controlled to be 0.0050% or less.

On the other hand, in the steel sheet according to the present invention, when the C content is low, the strength can be complemented using other strengthening methods. However, when the C content is less than 0.0005%, it is difficult to secure the strength and the decarburization cost is increased during steelmaking.

Accordingly, the C content is controlled to be 0.0050% or less. When extremely high workability and weld toughness are required, the C content is controlled to be preferably 0.0030% or less.

<Si: 0.20% to 1.0%>

Si is a solid-solution-strengthening element which is effective for high-strengthening. The present inventors found that, when the Si content is 0.20% or more and preferably 0.30% or more, plating adhesion after electroplating is improved.

The reason is that fine convex-concave portions are formed on the surface after pickling as described above. It is presumed that a Si oxide produced by Si on the surface being oxidized is not completely coated on the surface in the layer form, is non-uniformly distributed on the surface, and is non-uniformly dissolved during pickling and the Si oxide forms surface convex-concave portions. As a result, plating adhesion is improved. Accordingly, the Si content is controlled to be 0.20% or more and preferably 0.30% or more.

However, when the Si content is more than 1.0%, even if the other conditions are in the ranges of the present invention, adhesion is decreased. The reason is presumed to be as follows. The convex-concave portions are excessively large, hydrogen is likely to be generated during electroplating. In addition, hydrogen is more likely to accumulate, and a plating layer is likely to be exfoliated when an impact is applied thereto. Accordingly, the Si content is controlled to be 1.0% or less.

<Mn: 0.40% to 2.5%>

Mn is an element which increases the strength of steel sheet by solid solution strengthening as in the case of Si and is one of the important elements to improve plating adhesion.

The present inventors found that Mn improves plating adhesion after electroplating as in the case of Si. The reason is that surface convex-concave portions are formed as describe above. It is presumed that a Mn oxide produced by Mn on the surface being oxidized is not completely coated on the surface in the layer form, is non-uniformly distributed on the surface, and is non-uniformly dissolved during pickling and this Mn oxide forms surface convex-concave portions.

Therefore, plating adhesion is improved. When the Mn content is 0.40% or more, this effect is obtained. Therefore, the Mn content is controlled to be 0.40% or more and preferably 0.50% or more.

However, when the Mn content is more than 2.5%, even if the other conditions are in the ranges of the present invention, adhesion is decreased. The reason is presumed to be as follows. The convex-concave portions are excessively large, hydrogen is likely to be generated during electroplating. In addition, hydrogen is more likely to accumulate, and a plating layer is likely to be exfoliated when an impact is applied thereto. Accordingly, the Mn content is controlled to be 2.5% or less.

Mn has a mechanism in which the strength is increased by structure refinement and a mechanism in which the strength is increased by solid solution strengthening. By controlling the Mn content to be 0.7% or more, a decrease in secondary working brittleness resistance and weld toughness which may occur when the strength is complemented with other elements can be easily avoided. Accordingly, the Mn content is preferably 0.7% or more.

<P: 0.05% or Less>

P has a small decrease in workability even when being added and is an element which is effective for increasing the strength by solid solution strengthening. However, P is an element which segregates in grain boundaries to decrease secondary working brittleness resistance, causes solidifying segregation to occur in a weld part, and decreases weld toughness.

When the P content is more than 0.05%, P segregation occurs. Accordingly, the P content is controlled to be 0.05% or less. It is not necessary that the lower limit of the P content be particularly limited. However, when the lower limit of the P content is less than 0.005%, the refining cost is increased. Therefore, the lower limit of the P content is preferably 0.005% or more. When it is desired that a high-strength steel sheet is produced, the P content is controlled to be preferably 0.02% or more from the viewpoint of securing the strength.

<Ti: 0.010% to 0.050%>

Ti is an element which has high affinity to C and N, forms a carbonnitride during solidification or hot rolling, reduces the amount of C and N solid-soluted in steel, and increases workability.

However, when Ti content is less than 0.010%, the above effects cannot be obtained. Accordingly, the Ti content is controlled to be 0.010% or more. On the other hand, when the Ti content is more than 0.050%, the weld toughness of a welded joint is decreased. Accordingly, the Ti content is controlled to be 0.050% or less.

<Nb: 0.010% to 0.040%>

As in the case of Ti, Nb is an element which has high affinity to C and N, forms a carbonnitride during solidification or hot rolling, reduces the amount of C and N solid-soluted in steel, and increases workability.

However, when Nb content is less than 0.010%, the above effect cannot be obtained. Accordingly, the Nb content is controlled to be 0.010% or more. On the other hand, when the Nb content is more than 0.040%, the recrystallization temperature is increased, high-temperature annealing is necessary, and the weld toughness of a welded joint is decreased. Accordingly, the Nb content is controlled to be 0.040% or less.

<B: 0.0005% to 0.0030%>

B is an element which segregates in grain boundaries, increases the grain boundary strength and improves secondary working brittleness resistance. However, when the B content is less than 0.0005%, the above effects cannot be obtained. Accordingly, the B content is controlled to be 0.0005% or more.

On the other hand, when the B content is more than 0.0030%, since B segregates in γ grain boundaries and suppresses ferritic transformation during welding, a welded part and a heat-affected zone thereof have a low-temperature transformation structure. Therefore, the welded part and the heat-affected zone are hardened, and the weld toughness is decreased.

In addition, when a large amount of B is added, ferritic transformation is suppressed during hot rolling, a hot-rolled steel sheet having a low-temperature transformation structure is produced, the strength of the hot-rolled steel sheet is increased, and the load during cold rolling is increased. Further, when the B content is more than 0.0030%, the recrystallization temperature is increased, and high-temperature annealing is necessary. Therefore, the production cost is increased, and the in-plane anisotropy of an r value which is an index of deep drawability is increased, and press formability is decreased.

Accordingly, the B content is controlled to be 0.0030% or less and preferably 0.0015% or less.

<S: 0.02% or Less>

S is an impurity which is unavoidably mixed during steel refining and is an element which binds to Mn or Ti to form a precipitate and decreases workability. Therefore, the S content is controlled to be 0.02% or less and preferably 0.01% or less. It is not necessary that the lower limit of the S content be particularly limited. However, when the lower limit of the S content is less than 0.0001%, the production cost is increased. Therefore, the lower limit of the S content is preferably 0.0001% or more.

<Al: 0.01% to 0.30%>

Al is an element which is used as a deoxidation material during steel refining. However, when Al content is less than 0.01%, the above deoxidation effect cannot be obtained. Accordingly, the Al content is controlled to be 0.01% or more. On the other hand, when the Al content is more than 0.30%, the weld toughness and the workability are decreased. Accordingly, the Al content is controlled to be 0.30% or less.

<N: 0.0010% to 0.01%>

N is an element which is unavoidably mixed during steel refining. Solid-soluted N decreases workability, but a decrease in workability can be avoided if N forms a nitride with Ti, Al, and Nb. However, the weld toughness is decreased by this precipitate. Therefore, the N content is controlled to be 0.01% or less. It is not necessary that the lower limit of the N content be particularly limited. However, when the N content is less than 0.0010%, the production cost is increased. Accordingly, the N content is controlled to be 0.01% or less.

The remainder of the steel sheet according to the present invention, that is, components other than the above-described elements include Fe and impurities.

<[Mn]+5[Si]: 2.0 to 7.0>

Further, in the present invention, when the Si content is represented by [Si] and the Mn content is represented by [Mn], a value of "[Mn]+5[Si]" is limited to be 2.0 to 7.0. The reason is as follows. Even if Si and Mn are in the ranges of the present invention, when the value of "[Mn]+5[Si]" is less than 2.0, the fine convex-concave portion height of the surface is less than 0.005 µm. On the other hand, when the value of "[Mn]+5[Si]" is more than 7.0, the fine convex-concave portion height of the surface is more than 0.10 µm, plating adhesion is decreased.

Next, a method for producing the steel sheet according to the present invention will be described. When the steel sheet according to the present invention is produced, first, raw materials which are adjusted to obtain the above-described chemical composition are put into a converter or an electric furnace, followed by a vacuum degassing treatment to obtain a slab.

Next, this slab is hot-rolled under a heating temperature of 1000° C. to 1300° C., a finishing rolling temperature of $Ar_3$ temperature to 1000° C., and a coiling temperature of 850° C. or less to obtain a hot-rolled coil. The heating temperature of hot rolling is controlled to be 1000° C. or higher to secure the rolling temperature.

On the other hand, the heating temperature of hot rolling is controlled to be 1300° C. or lower to suppress the production of coarse TiN which causes decrease in toughness in hot rolling, to suppress the coarsening of austenite grains, and to suppress the heating cost.

When the finishing rolling temperature of hot rolling is lower than $Ar_3$ temperature, the workability of the steel sheet is decreased. Therefore, the finishing rolling temperature of hot rolling is controlled to be $Ar_3$ temperature or higher. addition, by controlling the finishing rolling temperature of hot rolling to be 1000° C. or lower, the structure of the steel sheet can be controlled to improve low-temperature toughness. Further, when the coiling temperature after hot rolling is higher than 850° C., the strength of the steel sheet after cold rolling and annealing is decreased. Therefore, the coiling temperature is controlled to be 850° C. or lower. The lower limit of the coiling temperature is not particularly limited but is preferably 400° C. or higher.

Next, after descaling by pickling, the hot-rolled steel sheet prepared using the above-described method is cold-rolled at a cold rolling reduction of 40% or higher to obtain a cold-rolled steel sheet. At this time, when the cold rolling reduction is lower than 40%, the strength of the annealed steel sheet is decreased, and deep drawability is decreased. The cold rolling reduction is preferably 60% to 85%. As a result, a plated steel sheet having superior strength and deep drawability can be obtained.

Next, the cold-rolled steel sheet is annealed at a recrystallization temperature or higher. At this time, when the annealing temperature is lower than the recrystallization temperature, a superior texture is not developed, and deep drawability is decreased. On the other hand, when the annealing temperature is increased, the strength of the steel sheet is decreased. Therefore, it is preferable that the cold-rolled steel sheet be annealed at 850° C. or lower.

Next, in order to remove an oxide which is non-uniformly dispersed on the surface and to obtain fine surface convex-concave portions, the non-plated surface of the cold-rolled coil is pickled using 10 g/l to 400 g/l of a sulfuric acid aqueous solution or using a pickling solution in which one or more selected from the group consisting of nitrates, sulfates, fluorosilicates, and fluoroborates are mixed with the sulfuric acid aqueous solution. Here, electrolytic pickling may be performed to increase the efficiency of pickling.

In the pickling solution, sulfuric acid which is used as a main agent is added to obtain a lytic action on an oxide film and to improve electrical conductivity. However, when sulfuric acid is coexistent with other solvents, the pickling efficiency is significantly poor in a concentration of less than 10 g/l. On the other hand, in a concentration of more than 400 g/l, pickling is excessive, and surface convex-concave portions are coarsened. Accordingly, in the present invention, sulfuric acid is used in a concentration of 10 g/l to 400 g/l.

In order to improve the removal speed of an oxide film, one or more selected from among fluorosilicates such as sodium fluorosilicate and potassium fluorosilicate and fluoroborates such as sodium fluoroborate and ammonium fluoroborate may added to the sulfuric acid aqueous solution.

By the sulfuric acid aqueous solution containing fluorosilicates and fluoroborates in each amount of 10 g/l, the removal speed of an oxide film can be significantly improved. Accordingly, the content of any of fluorosilicates and fluoroborates is controlled to be preferably 10 g/l or more. On the other hand, when the content of any of fluorosilicates and fluoroborates is more than 100 g/l, the effect is saturated. Accordingly, the content of any of fluorosilicates and fluoroborates is controlled to be preferably 100 g/l or less.

Nitrates have effects of improving the removal speed of an oxide film and suppressing excessive pickling. As nitrates, sodium nitrate, potassium nitrate, ammonium nitrate, and the like can be used. In order to reliably obtain the above-described effects, the content of nitrates is preferably 50 g/l or more. On the other hand, when the content of nitrates is more than 200 g/l, the effects are saturated. Therefore, the content of nitrates is controlled to be preferably 200 g/l or less.

Sulfates represented by sodium sulfate have an effect of suppressing excessive pickling. In order to reliably obtain the above-described effect, the content of sulfates is controlled to be preferably 50 g/l or more. On the other hand, when the content of sulfates is more than 200 g/l, the effect is saturated. Therefore, the content of sulfates is controlled to be preferably 200 g/l or less.

Next, an electroplating layer is formed on the steel sheet to obtain an electroplated steel sheet. It is preferable that the electroplating layer contain 0% to 20% of Ni and the balance including Zn and impurities. When a corrosive environment of a fuel tank is taken into consideration, the amount of Ni having an effect of stabilizing a zinc corrosion product and improving corrosion resistance is controlled to be preferably 2% or more and more preferably 5% or more. On the other hand, from the viewpoint of cost, the Ni content is controlled to be preferably 15% or less.

The plating deposition amount is controlled to be preferably 3 $g/m^2$ to 100 $g/m^2$ per single surface. By controlling the plating deposition amount to be 3 $g/m^2$ or more, higher corrosion resistance can be secured. By controlling the plating deposition amount to be 100 $g/m^2$ or less, a cost increase can be suppressed, pattern defects caused by unevenness in thickness can be suppressed, and a decrease in weldability can be suppressed. The plating deposition amount is controlled to be preferably 3 $g/m^2$ to 50 $g/m^2$ per single surface.

When a chemical conversion film, a chromate film, or various organic films are formed on a plating layer, the same effects can be obtained. In addition, when a coated steel sheet on which an organic film is formed is used, the same effects can be obtained.

EXAMPLES

Next, examples of the present invention will be described. However, conditions adopted in the examples are mere examples for confirming the operability and the effects of the present invention. The present invention is not limited to these conditions. The present invention may have various modifications without departing from the scope of the present invention as long as the object of the present invention can be achieved.

Example 1

Steel having a chemical composition shown in Table 1 was melted, was heated and held at 1220° C., and was hot-rolled under a hot-rolling finishing rolling temperature of $Ar_3$ temperature to 1000° C. and a coiling temperature of 630° C. to 670° C. to obtain a hot-rolled steel sheet having a thickness of 4 mm. Next, this hot-rolled steel sheet was pickled and then cold-rolled to obtain a cold-rolled steel sheet having a thickness of 1.2 mm.

TABLE 1

| | STEEL No. | C (%) | Si (%) | Mn (%) | P (%) | S (%) | Al (%) | Ti (%) | Nb (%) | B (%) | N (%) | [Mn] + 5[Si] (%) |
|---|---|---|---|---|---|---|---|---|---|---|---|---|
| EXAMPLES OF PRESENT INVENTION | 1 | 0.0043 | 0.62 | 2.12 | 0.049 | 0.004 | 0.010 | 0.015 | 0.039 | 0.0028 | 0.0035 | 5.2 |
| | 2 | 0.0005 | 0.20 | 1.37 | 0.035 | 0.020 | 0.035 | 0.010 | 0.026 | 0.0022 | 0.0020 | 2.4 |
| | 3 | 0.0030 | 0.32 | 1.49 | 0.025 | 0.015 | 0.048 | 0.018 | 0.030 | 0.0012 | 0.0021 | 3.1 |
| | 4 | 0.0021 | 0.28 | 1.75 | 0.011 | 0.005 | 0.030 | 0.019 | 0.015 | 0.0007 | 0.0034 | 3.2 |
| | 5 | 0.0028 | 0.67 | 1.28 | 0.031 | 0.005 | 0.038 | 0.024 | 0.030 | 0.0012 | 0.0021 | 4.6 |
| | 6 | 0.0020 | 0.38 | 0.72 | 0.042 | 0.002 | 0.145 | 0.014 | 0.035 | 0.0024 | 0.0012 | 2.6 |
| | 7 | 0.0025 | 0.79 | 0.84 | 0.018 | 0.004 | 0.054 | 0.012 | 0.024 | 0.0011 | 0.0025 | 4.8 |
| | 8 | 0.0015 | 1.00 | 1.96 | 0.032 | 0.004 | 0.042 | 0.022 | 0.025 | 0.0009 | 0.0012 | 7.0 |
| | 9 | 0.0010 | 0.63 | 0.99 | 0.034 | 0.010 | 0.036 | 0.024 | 0.018 | 0.0010 | 0.0010 | 4.1 |
| | 10 | 0.0035 | 0.21 | 1.04 | 0.031 | 0.002 | 0.050 | 0.016 | 0.030 | 0.0022 | 0.0013 | 2.1 |
| | 11 | 0.0022 | 0.47 | 1.07 | 0.032 | 0.005 | 0.047 | 0.011 | 0.035 | 0.0014 | 0.0023 | 3.4 |
| | 12 | 0.0018 | 0.72 | 1.34 | 0.031 | 0.004 | 0.027 | 0.025 | 0.034 | 0.0013 | 0.0014 | 4.9 |
| | 13 | 0.0013 | 0.20 | 1.25 | 0.005 | 0.002 | 0.034 | 0.021 | 0.038 | 0.0018 | 0.0042 | 2.3 |
| | 14 | 0.0048 | 0.54 | 2.50 | 0.049 | 0.004 | 0.025 | 0.010 | 0.039 | 0.0028 | 0.0035 | 5.2 |
| | 15 | 0.0033 | 0.69 | 1.67 | 0.015 | 0.003 | 0.072 | 0.020 | 0.030 | 0.0016 | 0.0046 | 5.1 |
| | 16 | 0.0024 | 0.95 | 0.40 | 0.010 | 0.001 | 0.162 | 0.048 | 0.033 | 0.0005 | 0.0032 | 5.2 |
| | 17 | 0.0015 | 0.52 | 2.16 | 0.032 | 0.004 | 0.042 | 0.022 | 0.025 | 0.0009 | 0.0012 | 4.8 |
| | 18 | 0.0018 | 0.82 | 1.78 | 0.014 | 0.001 | 0.285 | 0.010 | 0.024 | 0.0006 | 0.0027 | 5.9 |
| | 19 | 0.0030 | 0.30 | 1.49 | 0.025 | 0.003 | 0.048 | 0.018 | 0.030 | 0.0012 | 0.0072 | 3.0 |
| | 20 | 0.0040 | 0.45 | 1.05 | 0.035 | 0.004 | 0.013 | 0.035 | 0.010 | 0.0030 | 0.0017 | 3.3 |
| COMPARATIVE EXAMPLES | 21 | 0.0048 | 0.15 | 2.34 | 0.022 | 0.004 | 0.027 | 0.017 | 0.028 | 0.0019 | 0.0033 | 3.1 |
| | 22 | 0.0031 | 1.25 | 0.40 | 0.034 | 0.003 | 0.042 | 0.012 | 0.027 | 0.0025 | 0.0024 | 6.7 |
| | 23 | 0.0013 | 0.23 | 3.58 | 0.019 | 0.004 | 0.063 | 0.023 | 0.022 | 0.0010 | 0.0025 | 4.7 |
| | 24 | 0.0034 | 0.49 | 0.35 | 0.036 | 0.003 | 0.026 | 0.025 | 0.013 | 0.0006 | 0.0027 | 2.8 |
| | 25 | 0.0024 | 0.28 | 0.46 | 0.011 | 0.005 | 0.063 | 0.023 | 0.036 | 0.0022 | 0.0022 | 1.9 |
| | 26 | 0.0032 | 0.09 | 1.93 | 0.035 | 0.004 | 0.027 | 0.025 | 0.031 | 0.0027 | 0.0029 | 2.4 |
| | 27 | 0.0042 | 0.02 | 1.54 | 0.044 | 0.002 | 0.039 | 0.020 | 0.032 | 0.0016 | 0.0039 | 1.6 |
| | 28 | 0.0023 | 0.37 | 0.24 | 0.021 | 0.004 | 0.031 | 0.021 | 0.017 | 0.0019 | 0.0032 | 2.1 |
| | 29 | 0.0024 | 0.31 | 0.35 | 0.025 | 0.005 | 0.033 | 0.017 | 0.013 | 0.0016 | 0.0017 | 1.9 |
| | 30 | 0.0013 | 1.59 | 1.11 | 0.048 | 0.003 | 0.052 | 0.031 | 0.024 | 0.0011 | 0.0024 | 9.1 |
| | 31 | 0.0042 | 0.97 | 2.23 | 0.021 | 0.008 | 0.037 | 0.025 | 0.032 | 0.0019 | 0.0014 | 7.1 |
| | 32 | 0.0018 | 1.45 | 2.93 | 0.025 | 0.002 | 0.043 | 0.021 | 0.016 | 0.0015 | 0.0036 | 10.2 |
| | 33 | 0.0023 | 0.85 | 2.87 | 0.035 | 0.002 | 0.036 | 0.015 | 0.022 | 0.0021 | 0.0072 | 7.1 |

The balance of the chemical composition shown in Table 1 includes Fe and impurities. The underline of Table 1 represents a numerical value being out of the range of the present invention.

Further, this cold-rolled steel sheet was annealed in a cycle of being held at the recrystallization temperature or higher for 60 seconds to 120 seconds to obtain an annealed steel sheet. A surface of this annealed steel sheet was pickled using a pickling solution shown in Table 2 at 30° C. to 50° C. for 1 second to 30 seconds, and an electroplating layer was formed thereon. The plating composition and the plating deposition amount are as shown in Table 2.

from a height of 1 m. The test results are shown in Table 3. A case where there was no plating exfoliation is represented by "o", and a case where there was plating exfoliation is represented by "x". Whether or not there was plating exfoliation was determined by attaching an adhesive tape on a sample surface and then peeling therefrom after the test. A case where no plating layer was peeled off was determined as "no plating exfoliation (o)", and a case where a plating layer was peeled off and attached on the adhesive tape was determined as "plating exfoliation (x)".

TABLE 2

| | STEEL No. | PICKLING SOLUTION AFTER ANNEALING (KIND OF LIQUID SHOWN BELOW) | PLATING COMPOSITION | PLATING DEPOSITION AMOUNT (g/m$^2$) |
|---|---|---|---|---|
| EXAMPLES OF PRESENT INVENTION | 1 | A | Zn | 5 |
| | 2 | A + B | Zn—7% Ni | 20 |
| | 3 | A | Zn—12% Ni | 30 |
| | 4 | A | Zn—10% Ni | 40 |
| | 5 | A | Zn—10% Ni | 20 |
| | 6 | A + B + C | Zn—12% Ni | 20 |
| | 7 | A | Zn—10% Ni | 3 |
| | 8 | A | Zn—7% Ni | 40 |
| | 9 | A | Zn—12% Ni | 10 |
| | 10 | A + B + C | Zn—10% Ni | 20 |
| | 11 | A + B + C + D | Zn—7% Ni | 30 |
| | 12 | A | Zn—8% Ni | 30 |
| | 13 | A + B + C + D + E | Zn—10% Ni | 10 |
| | 14 | A + B + C + D | Zn—2% Ni | 20 |
| | 15 | A + B + C + E | Zn—12% Ni | 30 |
| | 16 | A | Zn—10% Ni | 40 |
| | 17 | A + C | Zn—7% Ni | 100 |
| | 18 | A | Zn—20% Ni | 20 |
| | 19 | A + B + C + D + E | Zn—10% Ni | 30 |
| | 20 | A | Zn—7% Ni | 40 |
| COMPARATIVE EXAMPLES | 21 | A | Zn—12% Ni | 10 |
| | 22 | A + B + C + E | Zn—10% Ni | 20 |
| | 23 | A + B + C + D + E | Zn—7% Ni | 30 |
| | 24 | A | Zn—12% Ni | 40 |
| | 25 | A | Zn—10% Ni | 10 |
| | 26 | A | Zn—2% Ni | 3 |
| | 27 | A | Zn—12% Ni | 100 |
| | 28 | A | Zn | 40 |
| | 29 | A | Zn—7% Ni | 10 |
| | 30 | A + B + C + D | Zn—15% Ni | 20 |
| | 31 | A | Zn—10% Ni | 30 |
| | 32 | A + B + C + D + E | Zn—7% Ni | 40 |
| | 33 | A + B + C | Zn—20% Ni | 10 |

*KIND OF PICKLING SOLUTION AFTER ANNEALING
A: 50 g/l OF SULFURIC ACID AQUEOUS SOLUTION
B: NITRATE
C: SULFATE
D: FLUOROSILICATE
E: FLUOROBORATE

Regarding the steel sheet immediately before plating, the fine convex-concave portion height was measured in an evaluation length of 20 μm using the above-described shape measurement laser microscopes VK-8700 and VK-8710 series (manufactured by Keyence Corporation).

In addition using the plated steel sheets of Examples and Comparative Examples prepared with the above-described method, a Dupont impact test was performed to evaluate plating adhesion. In the Dupont impact test, assuming that the steel sheet was pressed into a complicated shape such as a fuel tank, a weight having a tip shape with a punch diameter of 4 mm and a weight of 500 g which was more strict than a normal one was allowed to fall to the steel sheet

TABLE 3

| | STEEL No. | FINE CONVEX-CONCAVE PORTION HEIGHT (μm) | DUPONT IMPACT TEST |
|---|---|---|---|
| EXAMPLES OF PRESENT INVENTION | 1 | 0.02 | ○ |
| | 2 | 0.04 | ○ |
| | 3 | 0.01 | ○ |
| | 4 | 0.008 | ○ |
| | 5 | 0.03 | ○ |
| | 6 | 0.005 | ○ |
| | 7 | 0.05 | ○ |
| | 8 | 0.09 | ○ |
| | 9 | 0.052 | ○ |
| | 10 | 0.005 | ○ |

TABLE 3-continued

| | STEEL No. | FINE CONVEX-CONCAVE PORTION HEIGHT (μm) | DUPONT IMPACT TEST |
|---|---|---|---|
| | 11 | 0.005 | ○ |
| | 12 | 0.021 | ○ |
| | 13 | 0.08 | ○ |
| | 14 | 0.05 | ○ |
| | 15 | 0.07 | ○ |
| | 16 | 0.08 | ○ |
| | 17 | 0.1 | ○ |
| | 18 | 0.05 | ○ |
| | 19 | 0.09 | ○ |
| | 20 | 0.008 | ○ |
| COMPARATIVE EXAMPLES | 21 | <u>0.003</u> | X |
| | 22 | <u>0.18</u> | X |
| | 23 | <u>0.13</u> | X |
| | 24 | <u>0.004</u> | X |
| | 25 | <u>0.003</u> | X |
| | 26 | <u>0.001</u> | X |
| | 27 | <u>0.004</u> | X |
| | 28 | <u>0.004</u> | X |
| | 29 | <u>0.001</u> | X |
| | 30 | <u>0.13</u> | X |
| | 31 | <u>0.11</u> | X |
| | 32 | <u>0.18</u> | X |
| | 33 | <u>0.23</u> | X |

The underline of Table 3 represents a numerical value being out of the range of the present invention.

In the steel sheets of Examples No. 1 to 20 where the values are within the range of the present invention, the Si content is 0.20% to 1.0% and the Mn content is 0.40% to 2.5%. In addition, when the Si content is represented by [Si] and the Mn content is represented by [Mn], a value of "[Mn]+5[Si]" is 2.0 to 7.0. The fine convex-concave portion height of the steel sheet surface immediately before plating was 0.005 μm to 0.10 μm, and superior plating adhesion was shown in the Dupont impact test.

On the other hand, in the plated steel sheets of Comparative Examples No. 21 to 33 in which the Si content, the Mn content, and the value of "[Mn]+5[Si]" are out of the range of the present invention, the fine convex-concave portion height of the steel sheet surface immediately before plating was less than 0.005 μm or more than 0.10 μm, plating exfoliation was found in the Dupont impact test, and plating adhesion was insufficient.

INDUSTRIAL APPLICABILITY

According to the present invention, a steel sheet having superior plating adhesion can be obtained, and it is possible to provide an electroplated steel sheet which has superior press formability and plating adhesion in the automobile field and the home electronics field, particularly, for use in a fuel tank of a vehicle; a steel sheet for electroplating which is a material of the electroplated steel sheet; and methods for producing the same. In addition, according to the present invention, the allowable processing degree of a plated steel sheet is improved, and reduction in the weight of a vehicle, particularly, a fuel tank and complication of a vehicle body design can be realized. Accordingly, the present invention is highly applicable to the automobile industry.

The invention claimed is:

1. An electroplated steel sheet comprising:
   a steel sheet, and
   an electroplating layer which is formed on a surface of the steel sheet and consists of 0% to 20% of Ni and a balance including Zn and impurities, wherein:
   the steel sheet comprises, as a chemical composition, by mass %,
   C: 0.0005% to 0.0050%,
   Si: 0.20% to 1.0%,
   Mn: 0.40% to 2.5%,
   P: 0.05% or less,
   Ti: 0.010% to 0.050%,
   Nb: 0.010% to 0.040%,
   B: 0.0005% to 0.0030%,
   S: 0.02% or less,
   Al: 0.01% to 0.30%,
   N: 0.0010% to 0.01%, and
   a balance including Fe and impurities,
   wherein in the chemical composition, a Si content is represented by [Si], a Mn content is represented by [Mn], and a value of "[Mn]+5[Si]" is 2.0 to 7.0, and
   the steel sheet has a surface property in which an average of displacements of fine convex-concave portions of a measurement point that is obtained based on a moving average of continuous 31 points in total including 15 front points and 15 back points in a cross-sectional profile of the surface of the steel sheet obtained by measuring an average of displacements in an evaluation length of 10 μm or more at an interval of 0.07 μm is 0.005 μm to 0.10 μm.

2. A method for producing an electroplated steel sheet, the method comprising:
   continuously casting molten steel having the chemical composition according to claim 1 into a slab;
   heating the slab in a temperature range of 1000° C. to 1300° C.;
   hot-rolling the heated slab under a finishing rolling temperature of $Ar_3$ temperature to 1000° C. and a coiling temperature of 850° C. or lower to obtain a hot-rolled steel sheet;
   removing a surface scale of the hot-rolled steel sheet to obtain a pickled steel sheet, as a first pickling process;
   cold-rolling the pickled steel sheet at a cold rolling reduction of 40% or higher to obtain a cold-rolled steel sheet;
   annealing the cold-rolled steel sheet at a recrystallization temperature or higher;
   pickling a surface of the steel sheet using 10 g/l to 400 g/l of a sulfuric acid aqueous solution or using a pickling solution in which one or more selected from the group consisting of nitrates, sulfates, fluorosilicates, and fluoroborates are mixed with the sulfuric acid aqueous solution for 1 second to 30 seconds, as a second pickling process; and
   forming an electroplating layer, which contains 0% to 20% of Ni and the balance including Zn and impurities, on the surface of the steel sheet, in an amount of 3 $g/m^2$ to 100 $g/m^2$ per single surface.

* * * * *